United States Patent

Reisser

[15] 3,636,835

[45] Jan. 25, 1972

[54] COMPACTION VEHICLE

[72] Inventor: Vernon H. Reisser, 10617 Poppleton Ave., Omaha, Nebr. 68124

[22] Filed: May 5, 1969

[21] Appl. No.: 821,624

[52] U.S. Cl. ...................................................94/50 R
[51] Int. Cl. ...................................................E01c 19/26
[58] Field of Search ...................................94/50, 50 V

[56] References Cited

UNITED STATES PATENTS

| | | | |
|---|---|---|---|
| 2,128,273 | 8/1938 | Stevens | 280/6 |
| 1,375,185 | 4/1921 | Seiter | 180/20 |
| 2,270,390 | 1/1942 | Summers | 94/50 |
| 2,276,713 | 3/1942 | Bramble | 94/50 |
| 2,443,147 | 6/1948 | Ritchie | 94/50 X |
| 3,051,063 | 8/1962 | Roberts | 94/50 |
| 3,060,818 | 10/1962 | Roberts | 94/50 |
| 3,136,379 | 6/1964 | Lauster | 180/62 |
| 3,291,014 | 12/1966 | Paramythioti | 94/50 |
| 3,316,822 | 5/1967 | Seaman | 94/50 |
| 3,340,782 | 9/1967 | Novak | 94/50 |
| 3,434,557 | 3/1969 | Paramythioti | 180/6.48 |

Primary Examiner—Nile C. Byers, Jr.
Attorney—Zarley, McKee & Thomte

[57] ABSTRACT

A vehicle containing an area to carry the weight of substance, a compaction vehicle containing a weight box to carry the weight of substance, and movable weight containers and having a plurality of wheel groups being hoist supported and operatively connected by a hydraulic circuit to create predetermined equal and unequal loading conditions on the wheel groups while maintaining the three points of suspension.

8 Claims, 5 Drawing Figures

INVENTOR
VERNON H. REISSER
BY
Zarley, McKee & Thomte
ATTORNEYS

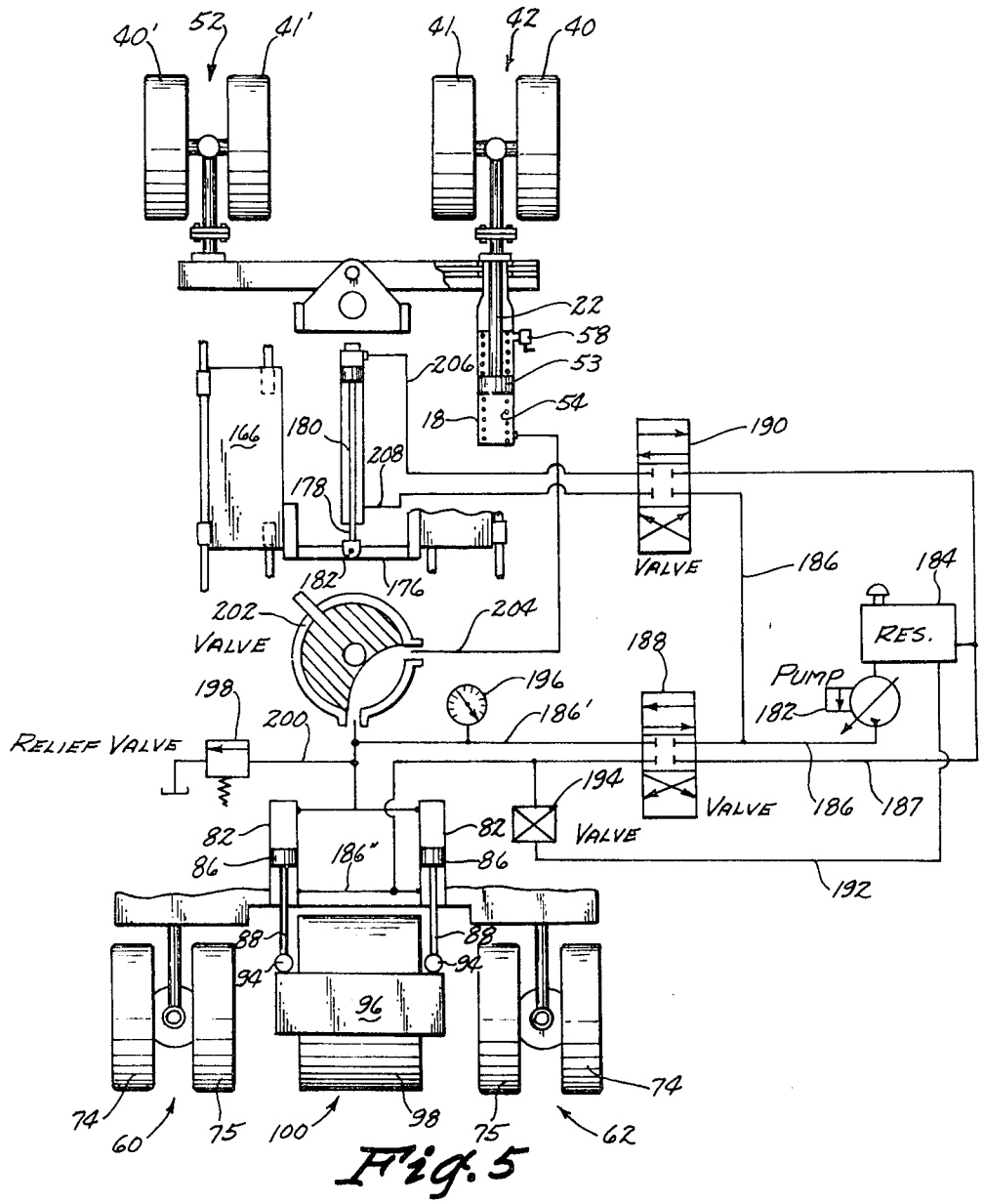

COMPACTION VEHICLE

The specifications for compaction equipment used in highway construction are quite rigid in regard to both pneumatic and steel tire contact pressures. Variations in terrain conditions as well as differences in the material being compacted greatly complicate the compaction process, and it becomes exceedingly difficult to maintain specified contact pressures on all wheel groups under these conditions.

Existing pneumatic tire compaction rollers are currently designed to distribute their total weight approximately per square inch contact area upon each pneumatic compactor tire. Present steel tire rollers are capable of distributing their total weight approximately equally upon each inch of steel tire width. Their primary function is to compact material to: (1) a specified minimum density; and (2) a required smoothness and profile, both horizontally and laterally. It is also a provision of usual highway specifications that tires will cause no objectionable marring or tearing of the surface or base. These compaction devices cannot adjust the load upon steel tires or pneumatic tires while the vehicles are moving over the surface being compacted. Weight must be added to the ballast box to increase wheel loads, and it becomes impractical to engage in intermittent loading to maintain profile specification.

It is nearly impossible for present pneumatic tire rollers to iron out high and low surfaces or to compact materials to a specified profile, and steel tire rollers experience this same difficulty.

To control a profile, a minimum of three laterally aligned wheel groups are required. To adjust to various profile specifications, the vertical position of the center wheel group in the aligned wheel groups must be vertically adjustable to achieve variations between concave, convex and straight line rolling. Existing vehicle designs cannot achieve versatility in these areas because the center wheel groups are not provided with optional means of having their vertical motion and vertical forces automatically adjustable or their vertical position adjusted with the remaining wheel groups.

It is therefore a principal object of this invention to provide a compaction vehicle wherein a center wheel group can be vertically coordinated with adjacent wheel groups to achieve variations in profile compaction and variations in compacting pressures of each wheel group in accordance with predetermined specifications.

It is a further object of this invention to provide a compaction vehicle wherein variations in contact pressures among different wheel groups can be achieved by movable hoist and ballast elements during the compacting operation.

A still further object of this invention is to provide a compaction vehicle which includes laterally aligned pneumatic and steel tire wheel groups.

A still further object of this invention is to provide a compaction vehicle which can achieve either equal or unequal loading on various wheel groups as conditions require.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 5 is a schematic view showing the hydraulic circuitry and control elements.

Figure 1:
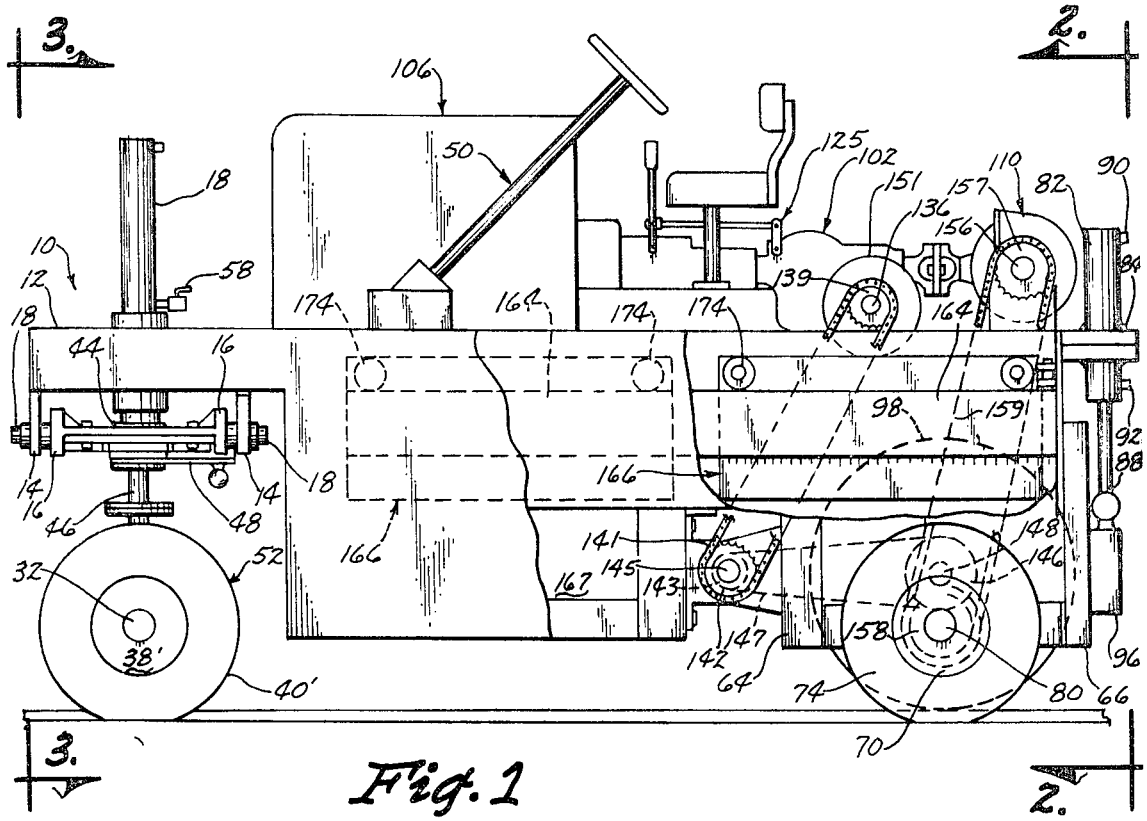
FIG. 1 is a side elevational view of the device of this invention.
Figure 3:
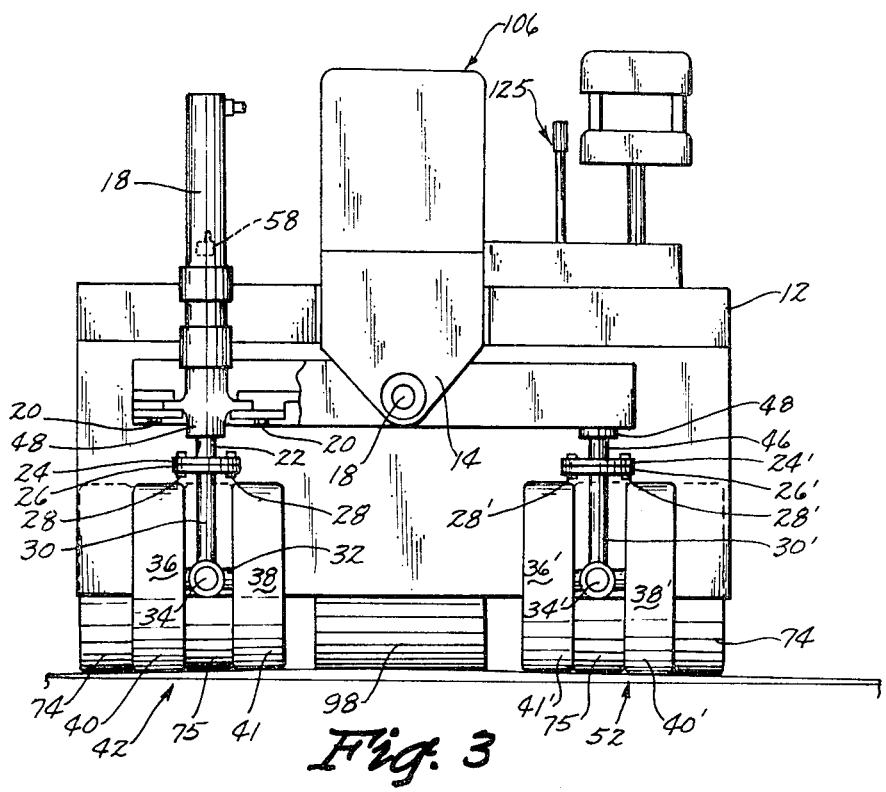
FIG. 3 is a front elevational view of the device of this invention.

The compaction vehicle 10 includes frame 12 which has support brackets 14 secured to its forward end (FIGS. 1 and 3). Beam 16 is pivotally secured to brackets 14 by spindle 18 whereupon beam 16 can pivot on a horizontal axis which is parallel to the longitudinal axis of the vehicle 10. The pivotal connection of beam 16 to frame 12 represents one of three points of suspension. Hoist cylinder 18 is rotatably secured to beam 16 by bolts 20 (FIG. 3), and reciprocating shaft 22 extends downwardly therefrom and terminates in plate 24. Plate 26 is secured to plate 24 by bolts 28, and shaft support 30. Axle 32 is pivotally connected to the lower end of shaft 30 by spindle 34, and wheels 36 and 38 are rotatably secured to axle 32 in conventional fashion. Wheels 36 and 38 include pneumatic tires 40 and 41, and will generally be referred to hereafter as wheel group 42.

Bearing hub 44 (FIG. 1) is welded or otherwise secured to the other end of beam 16, and the upper end of shaft 46 is rotatably mounted therein and adapted to pivot about a vertical axis. Steering links 48 (FIGS. 1 and 3) are rigidly secured to each of the shafts 22 and 46, and are in turn connected by conventional linkage (not shown) to steering mechanism 50. Wheel group 52 on the lower end of shaft 46 is identical to the corresponding parts of wheel group 42, and like reference numerals with " ' " thereafter denote these corresponding parts.

With reference to single-acting hoist of cylinder 18 (FIG. 5), it will be noted that a piston 53 is secured to the "upper" end of shaft 22 with cylinder 18, and a compressive means, consisting of compression coil springs 54 and 56 may be located, as shown, on opposite sides of the piston and extend from the piston to opposite ends of the cylinder, or a single compression coil spring below piston may be located (as shown) and extend from the piston to the opposite lower end of cylinder, or a compressive means of air below piston 53 is created by closing air vent valve 58 below piston 53. When coil spring 54 and 56 are not included and air vent valve is open to the atmosphere the compressive means is eliminated as oil is added or removed from the top of the cylinder, as will be discussed hereafter.

Figure 2:
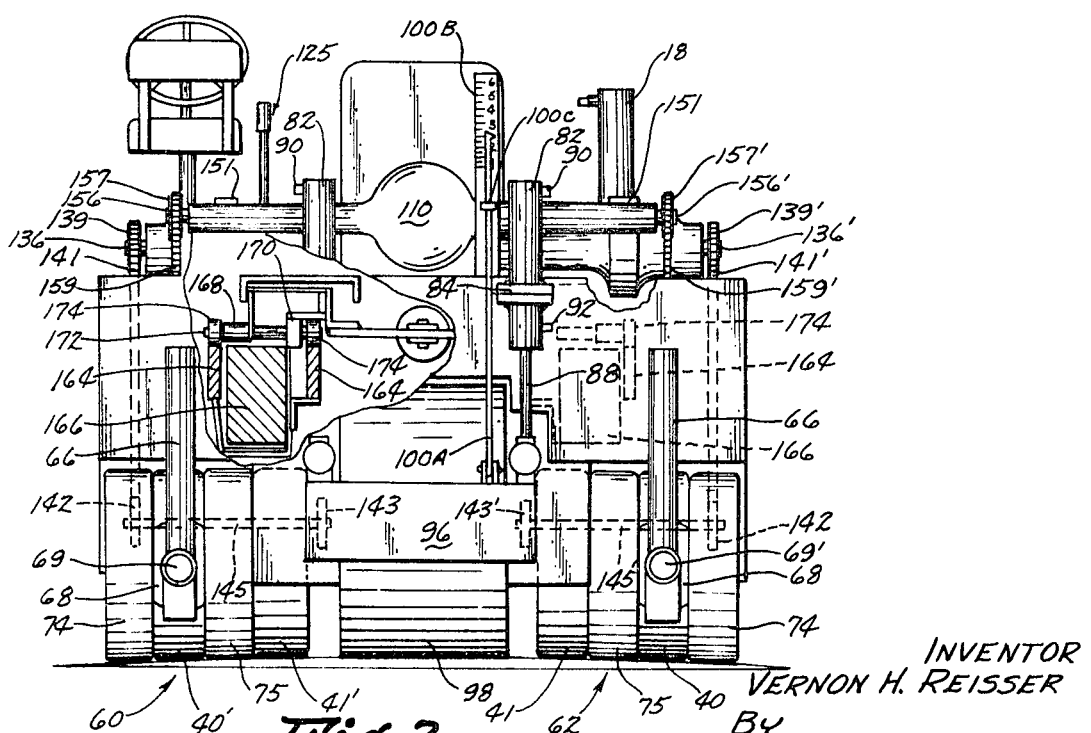
FIG. 2 is a rear elevational view of the device of this invention.

Outer rear wheel groups 60 and 62 are identical and like reference numerals will be used to identify the component parts thereof. L-shaped brackets 64 and 66 (FIG. 1) are welded or otherwise secured to frame 10, and gear housing 68 (FIG. 2) is pivotally mounted therebetween. Wheels 70 with pneumatic tires 74 and 75 thereon are rotatably secured to gear housing 68 by means of axle 80 in housing 68. The mounting connection of wheels 70 to axle 80 constitutes the first and second points of suspension of the frame. As seen in FIGS. 2 and 3, wheel groups 60 and 62 are spaced slightly greater than forward wheel groups 42 and 52 so that tires 74 and 75 cover the tire tracks of tires 40 and 41 (40' and 41') on the forward wheel groups.

A pair of vertically disposed cylinders 82 are secured in ball joints 84 to the rearward end of frame 10. Pistons 86 (FIG. 5) are connected to downwardly extending piston rods 88. Cylinders 82 are double-acting hoists with hydraulic fluid being added to or released from their upper ends by ports 90 and their lower ends by ports 92.

The lower ends of piston rods 88 terminate in ball joints 94 which are connected to horizontally disposed U-shaped subframe 96 to which steel tire 98 is rotatably secured. Steel tire 98 and its related structure will hereafter be referred to as wheel group 100. As will be described hereafter, cylinders 82 are able through the above-described structure of raising or lowering the wheel group 100. The relative position of wheel group 100 is visually ascertained by rod marker 100A which is pivotally secured by its lower end to subframe 96. Indicia marker 100B is secured to frame 10, and the upper end of marker 100A is held in slidable engagement therewith by clamp 100C on indicia marker 100B. A pair of oscillating compactor pneumatic tires could be used in lieu of the steel tire 98.

It is the purpose of this invention to have the vehicle propelled by the rear wheel groups regardless of whether the center wheel group 100 is raised or lowered. It is necessary to equalize rotation with torque to the radius of turn of the wheel groups which drive the vehicle rearwardly or forwardly. The steel tire 98 has a fixed radius while the rolling radius of the dual tires of wheel groups 60 and 62 will vary in accordance to the tire inflation or load.

Thus, rotation with torque from a power source must be equalized between the center wheel group 100, the right wheel group 62 and the left wheel group 60, when all three wheel groups are in traction with the rolling surface and propelling the vehicle. Likewise rotation with torque from a power source must be equalized between wheel groups 62 and 60 when wheel group 100 is retracted. This result is accomplished by means of a power divider differential assembly 108 of differential unit 102 being engaged or disengaged by lockout clutch 124. Lockout clutch is operated by conventional linkage 125. When lockout clutch 124 is engaged, rotation from power source 106 to input shaft 104 of differential unit 102 is equalized into rotation with torque to wheel groups 62, 100 and 60. When lockout clutch is engaged rotation from source of power 106 is positively divided by input shaft 104 between the center wheel group and the second differential unit 110, whether the center wheel group is extended or retracted by control valve 188. It is the second differential means that transforms rotation of the input shaft 104 into rotation with torque to adjacent wheel groups 62 and 60. Thus when adjacent wheel groups 62 and/or 60 lose traction, center wheel group 100 can be extended by hoist 82 controlled by valve 188 (as will be described hereafter) with a force and positive rotation against the rolling surface to move the vehicle forward or rearward. After all three aligned wheel groups regain traction, it is advisable to disengage lockout clutch 124 in order to relieve external stresses in the drive trains and to eliminate any marring or tearing of the surface being compacted. This feature is particularly advantageous when compacting sand, sandy clay or loose materials.

Figure 4:
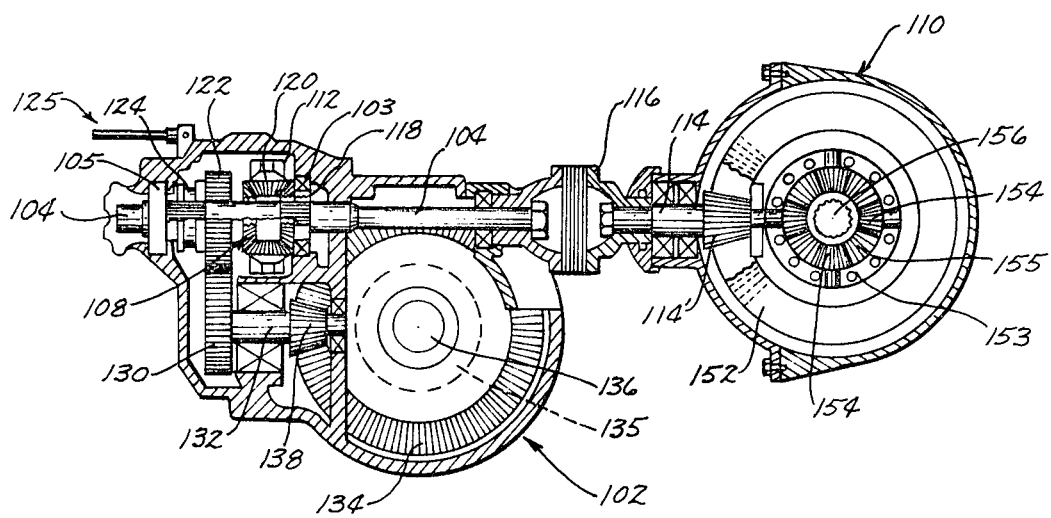
FIG. 4 is a partial sectional view of the differential means shown at an enlarged scale.

By construction, as shown in FIGS. 1 and 4, the output shaft of said power unit 106 is operatively connected to the input shaft 104 of differential unit 102 and supported on frame 10. Input shaft 104 is journaled at its opposite end and is connected to the input shaft 114 and pinion gear 114' of differential unit 110 by coupling 116.

Bevel gear 118 of power differential assembly 108 is secured by a spline to input shaft 104 and is in engagement with pinion gears 120. Pinion gears 120 are in engagement with opposite idler bevel gear 122. Opposite idler bevel gear and idler gear 122 are secured to each other and function as one gear, free to rotate around input shaft 104.

Pinion gears 120 are rotatively secured to pinion gear housing 112 and pinion gear housing 112 is rotatively mounted about bevel gear 118 and 122 of power divider differential assembly 108. Power differential assembly 108 is rotatively mounted on input shaft 104 and input shaft 104 is rotatively secured to differential unit 102 by bearings 103 and 105.

A clutch means 124 rotatively and operatively secured to a spline of the input shaft 104 for selective operatively engaging input shaft 104 with idler gear 122 of the power divider differential assembly 108 will, when engaged, divide rotation from a source of power 106 between idler gear 122 and differential means, differential unit 110 in this example, and when not engaged, will equalize the rotation of idler gear 122 with the rotation of input shaft 104.

Pinion gears 120 are rotatively secured within rotatable gear housing 112 and will equalize the rotation of idler gear 122 and its respective wheel group drive train to the rotation of bevel gear 118 secured to input shaft 104 and its respective wheel group drive train when clutch means 124 is not engaged with idler gear 122.

When clutch means 124 is engaged with idler gear 122 both center wheel group and second differential means of the adjacent right and left wheel groups are operatively connected to input shaft 104 and source of power 106.

Idler gear 122 is engaged with power gear 130 on shaft 132 which drives ring gear 134 on output shaft 136 through pinion gear 138. Sprockets 139 and 139' are rigidly connected to opposite ends of output shaft 136 and 136' and are operatively connected to idler sprockets 142 and 142' by power chains 141 and 141'. Idler drive shafts 145 and 145' are secured to idler sprockets 142 and 142' and intermediate idler sprockets 143 and 143'. Intermediate idler sprockets 143 and 143' power sprockets 146 and 146' by roller chains 147. Sprockets 146 and 146' are secured to center steel tire drive shaft 148 to rotate center steel tire 98. Steel tire drive shaft 148 is rotatively secured in subframe 96. Subframe 96 is operatively secured by a horizontal pivot to frame 10 on the forward end and ball joint of hoist shaft 88 and hoist cylinder 82 on the rearward end. Hoist cylinders 82 are operatively connected to frame 10 by hoist-supporting ball joints 84.

Differential unit 110, FIGS. 2 and 4, is a standard differential assembly used by the trucking industry and is used in this example to power wheel groups 60 and 62. Input shaft 114 drives ring gear 152 and differential housing 153. Pinion gears 154 are rotatively secured in differential housing 153 and are engaged with right and left side gears 155 and 155'. Side gears 155 are rotatively secured to differential housing assembly 153 and differential housing assembly 153 is rotatively secured to differential unit 110. Right and left drive axles 156 and 156' are secured to right and left side gears 155 and 155' and right and left drive sprockets 157 and 157'.

Roller chains 159 power sprockets 157 and 157', drive shaft 80 and 80' rotatively secure in housings 68 and 68'. Housings 68 and 68' are rotatively secured to wheel groups 60 and 62 and pivot laterally on horizontal axles 69 and 69'. Horizontal axles 69 and 69' are supported by vertical members 66 to the vehicles frame 10.

Thus rotation from a power source 106 through input shaft 104 of differential unit 102 to input shaft 114 equalized rotation through differential unit 110 into rotation with torque to wheel groups 60 and 62.

From the above explanation it can be resolved that when clutch means 124 operatively engages idler gear 122 of differential unit 102, rotation from a power source 106 is positively divided between the center wheel group 100 and the second differential unit 102 which transforms rotation from the power source 106 into rotation with torque to the adjacent right and left wheel group 62 and 60, of three independently mounted and laterally aligned wheel groups. The following formula can be resolved: One-half the sum of rotation of right and left wheel groups 62 and 60 multiplied by their respective fixed or variable rolling radius and gear reduction to the source of power is equal to the rotation of the center wheel group 100 multiplied by the rolling radius of the center wheel group and gear reduction to the said source of power.

Likewise when clutch means 124 is not engaged with idler gear 122, rotation from a power source 106 is equalized into rotation with torque to the three independently mounted and laterally aligned wheel groups 60, 100 and 62 and is equal to:

The sum of rotation of center wheel group 100, adjacent right wheel group 62 and adjacent left wheel group 60 of three independently mounted and laterally aligned wheel groups, multiplied by their respective fixed or variable rolling radius and their respective gear reduction to a power source 106, is equal to one-third the rotation of said power source.

FIG. 5 depicts the hydraulic circuitry which controls the vehicle. Hydraulic pump 182 is in communication with four-way valves 188 and 190 through pressure line 186. Four-way valves 188 and 190 are in communication with reservoir 184 through return line 187. Four-way valve 188 is in communication with the upper end of cylinder 82 by line 186' and the upper end of cylinder 18 by line 186', valve 202 and line 204. Manual controlled pressure regulator relief valve 198 is in communication with line 186" by line 200, and as indicated with reservoir 184. Four-way valve 188 is also in communication with the lower end of cylinders 82 by line 186" to raise and lower wheel group 100 when valve 194 and selector valve 202 are closed. When valve 202 and valve 194 are open, as shown in FIG. 5, equal loading is maintained between forward wheel group 42 and rearward wheel group 100 as the vehicles moves over the terrain and when the compressive means is not included with the pressure means. The compressive means being coil spring elements 54 and 56 above and below piston 53 of cylinder 18, spring element 56 below piston 53 of cylinder 18 or when air vent valve 58 is closed to the atmosphere and coil spring elements are not included. The proportion of equal loading of wheel groups 42 and 100 is dependent on the relative internal diameters of cylinders 18 and 82. As rearward wheel group 100 adjusts vertically to the terrain, piston 86 adjusts vertically to force oil to and from the chamber above piston 86 through the hydraulic circuit to the chamber above piston 53 of forward cylinder 18 of wheel group 42. Thus proportional equal loading of wheel groups 42 and 100 is maintained about the three points of suspension of the vehicle.

Again when valve 202 and shutoff valve 194 are open, unequal loading is maintained between the forward wheel group 42 and rearward wheel group 100 as the vehicle moves over the terrain when a compressive means is included with the pressure means. The compressive means being coil spring elements 54 and 56 above or below piston 53 of cylinder 18, spring element below piston 53 of cylinder 18, or the compression or decompression of air below piston 53 of cylinder 18 when air vent valve is closed and spring elements 54 or 56 are not included.

As rearward wheel group 100 adjusts vertically to the terrain, piston 86 adjusts vertically to force oil to and from the chamber above piston 86 through the hydraulic circuit to the chamber above piston 53 of forward cylinder 18 and wheel group 42.

The compressive force of the compressive means below piston 53 is added to the pressure means above piston 53 to cause a greater p.s.i. common pressure above piston 86 and greater load to be supported by wheel group 100 when steel tire 98 rolls over an elevated area or a lesser load to be supported by wheel group 100 when steel tire 98 rolls into a lower area. For an increased variation of load supported by center wheel group 100, oil is added to circuit 186', and 204 by valve 188. For a decreased variation of load supported by center wheel group 100, oil is released from circuit 186' and 204 by valve 188 until the pressure gauge 196 indicates the desired loading of the center wheel group. When coil springs 54 and 56 are in balance or coil spring 56 is not compressed, pressure gauge 196 will indicate equal load of wheel groups 42 and 100. Thus proportional unequal loading of wheel group 100 is maintained about the three points of suspension of the vehicle.

Present specification of self-propelled multiple-wheel pneumatic tire rollers require equal loading of all wheel groups. Thus, when air vent valve 58 is open, equal loading of all wheel groups is maintained; when the air vent valve 58 is closed a limited compressive means is added to the pressure means for unequal loading. It is important to note that forward wheel group 42 supports the same proportion of the vehicles forward weight for equal or unequal loading of the rearward center wheel group 100 as the vehicle travels over the terrain. In this example wheel group 42 supports one-half the forward weight because forward wheel group 42 and 52 are equidistant from the vehicles horizontal centerline. Wheel group 100 supports an equal proportion of the vehicles rearward weight as wheel group 100 adjusts vertically for equal loading when compressive means is not added to the pressure means.

For unequal loading of wheel group 100 a greater or lesser proportion of the vehicles rearward weight will be supported by wheel group 100 and will be in proportion to its vertical adjustment. The unequal loading of the rearward center wheel group will be inversely proportional to the weight supported by the adjacent right and left wheel groups 62 and 60.

To maintain the above equal and unequal loading when hoists 82 are double-acting hoists, oil below piston 86 must flow unrestricted to and from reservoir 184 and opening shutoff valve 194.

To retract or extend center wheel group 100, valve 202 and shutoff valve 194 must be closed. Then valve 188 can force fluid pressure below piston 86 and return fluid above piston 86 to the reservoir 184 or force fluid pressure above piston 86 and return fluid below piston 86 to the reservoir 184. The pressure regulator relief valve 198 is adjusted to the maximum permissible safe or desired unequal loading of the wheel group 100 when wheel group 100 is extended to a fixed position. Valve 202 closes the fluid pressure line 204 and shutoff valve closes return line 192. Wheel group 100 can then be extended to a fixed vertical position for lateral profile rolling or when lockout clutch 124 is engaged in differential unit 102, as previously explained, positive rotation of pneumatic tires or a steel tire of wheel group 100 will help to propel the vehicle forward or rearward when the adjacent wheel group 60 and/or 62 lose traction. This is a very important feature for very heavy loaded compaction rollers with three independently mounted and laterally aligned wheel groups.

Center wheel group 100 can be retracted when greater compacting tire loads are desired on the adjacent right or left wheel groups or when the center wheel group 100 is equipped with a steel tire, as is shown, the center wheel group can be retracted to travel on the highway.

In order to maintain equal loading of the outermost forward and rearward pneumatic tires when center wheel group is retracted, movable containers 166 are provided. Two pairs of forwardly and rearwardly extending rails 164 are secured to opposite sides of frame 10. Ballast containers 166 have bearing supports 168 and 170 through which horizontal shafts 172 extend. Rollers 174 on the ends of shafts 172 bear on rails 164 to rotatably support the containers 166. The rearward ends of containers 166 are secured together by yoke 176 (FIG. 5) which is connected to the rearward end of piston rod 178 of horizontal hydraulic cylinder 180 by clevis 182. Cylinder 180 is connected to frame 10 in any convenient manner.

Equal loading contemplates the compacting of materials without regard to lateral profile. Equal loading per square inch of contact area, or per lineal inch of contact width of pneumatic tires or with similar equal loading per lineal inch width of the steel tire is accomplished when the hoist-supported wheel groups 42 and 100 are operatively connected within the pressure circuitry. Equal loading of the outermost forward and rearward compactor tires requires that weight container be moved forward to divide the vehicle's weight equally upon the forward and rearward wheel groups when the center wheel group 100 is retracted.

The concept of unequal loading contemplates the compaction of materials to a specified lateral profile. This condition is accomplished when center wheel group is connected with the pressure circuitry and a compressive means. The compressive means is the compressive or decompressive force of air below piston 53 of cylinder 18 when air vent valve 58 is closed and the spring elements 54 and 56 are not included, or when spring elements 54 and 56 are included above and below, or spring element 56 below piston 53 of cylinder 18 and air vent valve 58 is open or closed, as previously explained. The unbalanced compressive force below piston 53 against an opposite greater force within the common pressure means above piston 53 will cause a greater force above piston 86 of cylinder 82 supporting rearward center wheel when steel tire 98 rolls over an elevated area, or will cause a lesser force above piston 86 of cylinder 82 supporting rearward center wheel when steel tire 98 rolls in a lower area. The pounds of greater or lesser force imposed upon the steel tire are measured by pressure gauge 196. For a still greater lineal force to be imposed upon the center wheel group 100, than on the adjacent right and left wheel groups 60 and 62, valve 188 is momentarily opened which will add more oil above the piston in cylinder 18. The oil added to this common pressure means will further compress spring 56 below the piston 53 of cylinder 18 or will compress air below piston 53 when air vent valve is closed. The added compressive force of spring 56 or air will be added to the pounds per square inch of common hydraulic pressure within the pressure means to increase the imposed force upon center wheel group 100 and steel tire 98.

To decrease the lineal force to be imposed upon the steel tire 98 with respect to the wheel groups 60 and 62, the return side of valve 188 is momentarily opened from its hold position. This will release oil above the piston of cylinder 18, in the hydraulic circuit connecting cylinders 18 and 82, to the reservoir 184. Oil below the pistons of cylinder 82 will return to the reservoir at approximately atmospheric pressure because shutoff valve 194 is open. The lesser compressive force of spring 56 or air will decrease the pounds per square inch of common hydraulic pressure within the pressure system to decrease the imposed force upon the steel tire 98. This procedure can be continued until the pressure gauge indicates the desired equal, or unequal, loading of a pair of compactor tires or a steel tire as shown, supported by cylinders 82 of wheel group 100. When, as shown, springs 56 and 54 on opposite sides of piston 53 of cylinder 18 are in balance, as indicated by the pressure gauge, equal loading is attained.

To maintain the desired equal loading of both the forward and rearward wheel groups, whether center wheel group 100 consists of a pair of pneumatic compactor tires or a steel tire, the internal diameter of the forward cylinder 18 is balanced with the internal diameter of cylinder 82 supporting wheel group 100 when cylinders 18 and 82 are operatively connected by a hydraulic circuit. The vertical force and weight supported by each hoist-supporting wheel group will be equal to the internal area of each hoist multiplied by the p.s.i. of common hydraulic pressure between the hoist-supported wheel groups. In this example the outermost forward and rearward wheel groups are supported by 7:50×15 pneumatic compactor tires. Center wheel group 100 may be supported by a pair of 7:50×15 pneumatic compactor tires or a steel tire, as shown. Cylinder 18 is 5 inches in internal diameter and cylinders 82 are 3 inches in internal diameter. When pressure gauge 196 indicates 240 p.s.i., wheel group 42 and wheel group 100 will each be supporting approximately 4,800 pounds of the vehicle's weight.

Likewise, to maintain equal loading on the wheel groups 42, 52, 60 and 62 when center wheel group is retracted, the right and left ballast containers 166 are moved forward by cylinder 180 to divide the vehicle's weight between the forward and rearward outermost wheel groups. When ballast box 167 is loaded with wet sand, a maximum load of 4,000 pounds, or approximately 90 pounds per square inch, for each 7:50×15 pneumatic compactor tire can be maintained.

Present pneumatic tire compaction rollers are currently designed to distribute the total weight approximately equally per square inch area upon each pneumatic compactor tire. Their primary function is to compact material to a specified density without regard to lateral or horizontal profile. Present steel tire rollers are currently designed to distribute their total weight approximately equally upon each lineal inch of steel tire width. Because the steel tire of the steel roller are designed to roll only flat surfaces, they will iron out high and low areas to a flat, smooth surface. It is nearly impossible for present pneumatic tire rollers to iron out high and low surfaces or compact materials to the specified profile. It is very difficult for both the steel tire roller and pneumatic tire roller, when working together, to iron out high and low spots or compact material to the specified cross section in profile as required by the specifications.

The cross section of highways are designed on a parabolic curve, to divide traffic and drain the surface of moisture. The horizontal centerline of a highway is the crown of the highway except on curves. On curves, the crown is blended into a flat surface. The elevation of the crown of a highway may vary from 6 inches above its lateral opposite sides on city streets and resurfacing of old streets to a minimum on interstate highways.

Current highway specifications require that both steel tire rollers and self-propelled pneumatic tire rollers be used simultaneously to compact bituminous surfaces. Their primary function is to compact materials to a specified minimum density, required smoothness and profile both horizontally and lateral which allows a maximum variation of one-quarter of an inch in binder course or one-eighth of an inch in the surface course when checked with a 10-foot straight edge placed parallel to the centerline of the highway. Variations greater than the above specification must be corrected or reworked. It is one of the objectives of this invention to measure the variations of smoothness while the surface is being compacted so that both operator of the roller and inspecting engineer can visually read and check the variations.

There are two general operating conditions for the vehicle of this invention and these are:

1. When the weight of the vehicle is distributed upon all of the wheel groups, and
2. When the weight of the vehicle is distributed upon the outermost wheel groups (42, 52, 60 and 62 in this example) with the center wheel group (100 in this example) retracted.

Under both conditions, stability is maintained about the three points of suspension of the vehicle. The vehicle does not necessarily maintain three points of suspension when the center wheel group 100 is not operatively connected within the hydraulic circuitry of FIG. 5, and when the center wheel group 100 is extended to a fixed vertical position with a force against the terrain. This latter condition is accomplished when valve 202 and 194 are closed and when valve 188 is opened momentarily from a hold position to exert fluid pressure into the upper ends of cylinders 82. This working condition is very useful when an extreme compressive force is required to iron out ridges or high spots on flat bituminous surfaces, or when a lateral parabolic profile is specified. Because these operations would require that the self-propelled compaction roller move slowly over near horizontal surfaces, it would not be necessary to maintain the three points of suspension of the vehicle every instant in order to be stable.

Relief valve 198 is manually set to bypass oil to the reserve tank beyond a maximum permissible hydraulic pressure which will insure safe loading of steel tire 98 and stability of the compaction roller. Loads greater than the relief valve setting will cause the steel tire to raise automatically. Pointer 100A will automatically indicate on marker 100R the relative vertical position of steel tire 98 with respect to the adjacent wheel groups.

The force in pounds imposed upon the rolling surface by the center wheel group 100 would be measured by pressure gauge 196. A compressive load of approximately 400 pounds per lineal inch of steel tire width can safely be maintained. This working condition will also be very useful when the right or left wheel group 62 and/or 60 lose traction, at which time the lockout clutch can be engaged to move the vehicle forward or rearward.

Brakes 151 are provided to control the rotation of the center wheel group 100. Brakes can also be utilized in conjunction with the outer wheel groups 60 and 62.

When the center wheel group 100 and center wheel group drive train is operatively connected to input shaft 104 by coupline 116, the third differential means is incorporated within a differential housing 135 (FIG. 4) and is secured to ring gear 134. Its function is to equalize rotation between the right and left drive train when chains are assembled on the sprockets which power the center wheel group 100.

The shortcomings of the existing devices are overcome by the three laterally aligned wheel groups 60, 100 and 62 wherein the center wheel group 100 is vertically adjustable. The existing equipment does not provide a center wheel group whose vertical motion and desired controllable vertical force can adjust automatically with the remaining wheel groups while maintaining the three points of suspension of the vehicle. Similarly, existing equipment does not provide a center wheel group that can be controlled vertically to establish a fixed vertical position with respect to the right or left wheel groups for fixed lateral profile. The vehicle of this invention achieves the desired controllable force by equal or unequal loading of the center wheel group.

Compaction of subbase, base or surface course construction upon irregular surfaces or gentle slopes require maximum compressive loads. It is also on this type of construction that maximum lateral stability is required about the three points of suspension. To maintain maximum lateral stability the center wheel group must be retracted. The outermost forward and rearward oscillating pair of wheel members are laterally positioned equidistant from the vehicles horizontal centerline so that with each passage of the compaction vehicle the outermost rearward pair of compactor tires will overlap the tire tracks of the outermost forward pair of compactor tires.

When the machine is moving in the opposite direction, the horizontal alignment would be adjusted by steering so that the outermost forward and rearward wheel groups compact the area between the horizontal strips previously compacted. This procedure can continue until all the surface is compacted. Present pneumatic tired self-propelled rollers are not able to safely compact irregular surfaces on gentle slopes. The vehicle of this invention has a known forward and rearward weight when empty, or when either water, dry sand or wet sand is added to the ballast box 167. The containers 166, which can be moved forward or rearward in the manner described, have a constant known weight. When the containers 166 are positioned over the rear three wheel group assemblies 60, 100 and 62, for compaction of bituminous armor coat, or surface treatment, the outermost forward and rearward pneumatic tire wheel groups will be capable of producing contact pressure of 45 to 55 pounds per square inch and the steel tire 98 will be loaded to produce a compressive force of not less than 200 pounds per inch width of steel tire when material weight is added to ballast box 167. When the steel tire 98 is retracted, the ballast container 166 will be moved forward, and wheel groups 42, 52, 60 and 62 will be capable of producing contact pressure of approximately 80 pounds per square inch when compactor tire pressure is increased.

Likewise when the compaction roller is fully loaded, the ballast containers 166 are moved forward, and the center steel tire is retracted, the self-propelled roller of this invention can travel on the highway from job to job, with less than 16,000 pounds per axle load. A maximum 16,000-pound axle load is also a specification of self-propelled pneumatic tire rollers. Thus, the vehicle of this invention can be used on nearly all types of compaction work.

I claim:
1. A vehicle of the class described,
a frame having forward and rearward ends,
a wheel assembly comprised of a plurality of wheel groups on the forward and rearward ends of said frame, and at least one of said wheel assemblies being comprised of at least three independently mounted and laterally aligned wheel groups,
a hoist mechanism on said frame and operatively secured to a wheel group in each of said forward and rearward wheel assemblies for raising and lowering such wheel assemblies with respect to said frame,
means operatively connecting said hoist mechanisms to permit coordinated movement thereof,
a power means mounted on said frame,
an output shaft on said power means,
first and second differential means operatively secured to said output shaft,
the center wheel group of said three aligned wheel groups being operatively secured to said first differential means,
and the wheel groups adjacent said center wheel group being operatively secured to said second differential means.

2. The vehicle of claim 1 wherein said first differential means includes a clutch means for selectively operatively engaging said first differential means with said output shaft of said power means.

3. A vehicle of the class described,
a frame having forward and rearward ends,
a wheel assembly comprised of a plurality of wheel groups on the forward and rearward ends of said frame and at least one wheel assembly being comprised of three independently mounted and laterally aligned wheel groups operatively connected to a source of power on said frame,
a first differential means having an input shaft,
said power source adapted to provide rotational power to the input shaft of the said differential means,
a second differential means,
said input shaft adapted to provide rotational power to the second differential means,
said first differential means including a gear secured to said input shaft,
said second differential means being operatively connected to said input shaft,
whereby said first differential means equalizes rotation with torque between second differential means and the center wheel group of said three independently mounted and laterally aligned wheel groups, and whereby said second differential means equalizes rotation with torque between the right wheel group and the left wheel group of the three independently mounted and laterally aligned wheel groups so that the sum of rotation of the center wheel group and the adjacent right wheel group and the adjacent left wheel group of three independently mounted and laterally aligned wheel groups, multiplied by their respective fixed or variable rolling radius and their respective gear reduction to a power source, is equal to one third the rotation of said power source.

4. The vehicle of claim 3 wherein said first differential means includes a clutch means for selectively operatively engaging said first differential means with said output shaft of said power means, said clutch means being movable between operative and inoperative positions, said second differential means taking power directly from said input shaft when said clutch means is in its operative position.

5. A vehicle of the class described,
a frame having forward and rearward ends,
a wheel assembly comprised of a plurality of wheel groups on the forward and rearward ends of said frame, and at least one of said wheel assemblies being comprised of at least three independently mounted and laterally aligned wheel groups,
a hoist mechanism on said frame and operatively secured to a wheel group in each of said forward and rearward wheel assemblies for raising and lowering such wheel assemblies with respect to said frame,
means operatively connecting said hoist mechanisms to permit coordinated movement thereof,
said hoist mechanisms being comprised of hydraulic cylinder means,
a hydraulic circuit including a source of hydraulic power operatively secured to said cylinder means,
said three aligned wheel groups are comprised of a center steel tire and laterally adjacent wheel groups comprising pneumatic tires,
one of said hoist mechanisms being operatively connected to said steel tire,
a pressure gauge in said hydraulic circuit,
and an indicia marker means connected to said steel tire to permit visual observation in the vertical positioned variations of said steel tire with respect to the adjacent wheel groups.

6. In a vehicle of the class described,
a frame having forward and rearward ends,
a wheel assembly comprised of a plurality of wheel groups on the forward and rearward ends of said frame, and at least one of said wheel assemblies being comprised of at least three independently mounted and laterally aligned wheel groups,
a hoist mechanism on said frame and operatively secured to a wheel group in each of said forward and rearward wheel assemblies for raising and lowering such wheel assemblies with respect to said frame,
power means on said frame and operatively secured to at least one of said wheel groups that are operatively secured to a hoist mechanism whereby said power means can provide rotational power to such wheel groups to propel said vehicle on a supporting surface, means operatively connecting said hoist mechanisms to permit coordinated movement thereof, said hoist mechanisms including a hydraulic cylinder housing, a piston movably mounted in said housing, a piston rod on said piston and being operatively secured to one of said wheel assemblies, said hydraulic cylinder connected to a hydraulic circuit comprised of a control valve means, and a fluid reservoir and hydraulic pump, said hydraulic circuit connecting the hoist mechanisms on each end of said frame.

7. A vehicle of the class described, a frame having forward and rearward ends, a wheel assembly comprised of a plurality of wheel groups on the forward and rearward ends of said frame, and at least one of said wheel assemblies being comprised of at least three independently mounted and laterally aligned wheel groups, a hoist mechanism on said frame and operatively secured to the centermost of said three wheel groups on one end of said frame, and to one of the wheel groups on the other end of said frame, the hoist mechanism secured to said centermost wheel group being a double-acting hoist mechanism adapted for powered vertical movement in upward and downward directions to raise and lower said centermost wheel groups with respect to said frame and with respect to the terrain supporting said vehicle to provide positive vertical adjustment thereof with respect to said terrain; said hoist mechanism secured to said wheel group on the other end of said frame being adapted to raise and lower said wheel group with respect to said frame, hydraulic means operatively connecting said hoist mechanisms to permit coordinated movement thereof;

at least some of said plurality of wheel groups being substantially rigid with said frame and being incapable of vertical adjustment with respect to said frame, and said wheel groups being of sufficient number and location on said frame so that said frame and said vehicle will be supported at all times by a combination of rigidly mounted wheel groups and wheel groups that are adjustably secured to said vehicle by said hoist mechanisms.

8. The vehicle of claim 7 wherein the outer wheel groups of said three wheel groups are rigidly affixed against vertical displacement with respect to said frame whereby said outer wheel groups can support said frame if a failure occurs in the hoist mechanism connected to said centermost wheel group.

* * * * *